(12) United States Patent
Lee et al.

(10) Patent No.: US 11,973,244 B2
(45) Date of Patent: Apr. 30, 2024

(54) BATTERY MODULE HAVING GUIDE FOR RESTRICTING MOVEMENT OF BUSBAR FRAME, AND BATTERY PACK AND VEHICLE COMPRISING SAME

(71) Applicant: LG Chem, Ltd., Seoul (KR)

(72) Inventors: Young-Ho Lee, Daejeon (KR);
Jun-Yeob Seong, Daejeon (KR);
Jong-Ha Jeong, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 676 days.

(21) Appl. No.: 17/055,424

(22) PCT Filed: Dec. 18, 2019

(86) PCT No.: PCT/KR2019/017945
§ 371 (c)(1),
(2) Date: Nov. 13, 2020

(87) PCT Pub. No.: WO2020/138818
PCT Pub. Date: Jul. 2, 2020

(65) Prior Publication Data
US 2021/0194098 A1    Jun. 24, 2021

(30) Foreign Application Priority Data
Dec. 26, 2018    (KR) .................. 10-2018-0169965

(51) Int. Cl.
*H01M 50/505*    (2021.01)
*B60L 50/64*    (2019.01)
(Continued)

(52) U.S. Cl.
CPC ........... *H01M 50/505* (2021.01); *B60L 50/64* (2019.02); *H01M 10/425* (2013.01);
(Continued)

(58) Field of Classification Search
CPC .. H01M 50/20; H01M 50/204; H01M 50/211; H01M 50/244; H01M 50/291;
(Continued)

(56) References Cited

U.S. PATENT DOCUMENTS

2014/0377591 A1    12/2014 Cho et al.
2017/0077508 A1*    3/2017 Hoshina ................ H01M 4/131
2020/0014005 A1    1/2020 Lee et al.

FOREIGN PATENT DOCUMENTS

EP    2894695 A2    7/2015
EP    3389113 A1    10/2018
(Continued)

OTHER PUBLICATIONS

WO-2018124751-A1 English machine translation (Year: 2018).*
(Continued)

*Primary Examiner* — Scott J. Chmielecki
(74) *Attorney, Agent, or Firm* — Lerner David LLP

(57) ABSTRACT

A battery module includes a cell stack; a bus bar frame assembly having a front bus bar frame configured to cover one longitudinal side of the cell stack, a rear bus bar frame configured to cover another longitudinal side of the cell stack, and an upper cover configured to cover at least a portion of an upper surface of the cell stack; and a module frame coupled to the bus bar frame assembly, wherein the front bus bar frame includes at least one first upper guide formed to protrude at an upper end thereof and at least one first side guide formed to protrude at a side portion thereof, and the rear bus bar frame includes at least one second upper guide formed to protrude at an upper end thereof and at least one second side guide formed to protrude at a side portion thereof.

11 Claims, 14 Drawing Sheets

(51) Int. Cl.
  *H01M 10/42*   (2006.01)
  *H01M 10/48*   (2006.01)
  *H01M 50/211*  (2021.01)
  *H01M 50/244*  (2021.01)
  *H01M 50/249*  (2021.01)
  *H01M 50/271*  (2021.01)
  *H01M 50/291*  (2021.01)
  *H01M 50/50*   (2021.01)
  *H01M 50/569*  (2021.01)

(52) U.S. Cl.
  CPC ....... *H01M 10/486* (2013.01); *H01M 50/211* (2021.01); *H01M 50/244* (2021.01); *H01M 50/249* (2021.01); *H01M 50/271* (2021.01); *H01M 50/291* (2021.01); *H01M 50/50* (2021.01); *H01M 50/569* (2021.01); *H01M 2010/4271* (2013.01); *H01M 2220/20* (2013.01)

(58) Field of Classification Search
  CPC ... H01M 50/50; H01M 50/505; H01M 50/507
  See application file for complete search history.

(56) References Cited

FOREIGN PATENT DOCUMENTS

| | | |
|---|---|---|
| JP | 5342184 B2 | 11/2013 |
| KR | 20070056429 A | 6/2007 |
| KR | 20150000774 A | 1/2015 |
| KR | 20150052755 A | 5/2015 |
| KR | 20150137841 A | 12/2015 |
| KR | 20170094985 A | 8/2017 |
| KR | 20180067198 A | 6/2018 |
| KR | 20180078777 A | 7/2018 |
| KR | 20180099438 A | 9/2018 |
| WO | 2018124494 A2 | 7/2018 |
| WO | 2018124751 A1 | 7/2018 |
| WO | WO-2018124494 A2 * | 7/2018 .............. B60L 50/50 |
| WO | WO-2018124751 A1 * | 7/2018 .............. B60L 50/64 |

OTHER PUBLICATIONS

WO-2018124494-A2 English machine translation (Year: 2018).*
Extended European Search Report for Application No. 19901859.9 dated Sep. 23, 2021, pp. 1-9.
International Search Report for Application No. PCT/KR2019/017945 dated Apr. 3, 2020, 2 pages.

* cited by examiner

BATTERY MODULE HAVING GUIDE FOR RESTRICTING MOVEMENT OF BUSBAR FRAME, AND BATTERY PACK AND VEHICLE COMPRISING SAME

CROSS-REFERENCE TO RELATED APPLICATIONS

The present application is a national phase entry under 35 U.S.C. § 371 of International Application No. PCT/KR2019/017945, filed Dec. 18, 2019, published in Korean, which claims priority to Korean Patent Application No. 10-2018-0169965 filed on Dec. 26, 2018 in the Republic of Korea, the disclosures of which are incorporated herein by reference.

TECHNICAL FIELD

The present disclosure relates to a battery module having a guide for restricting movement of a bus bar frame, and a battery pack and a vehicle including the battery module. More particularly, the present disclosure relates to a battery module having a structure capable of preventing a bonding portion between a bus bar and an electrode lead from being damaged by restricting a bus bar frame coupled to one longitudinal side and the other longitudinal side of a cell stack not to move inside a module frame due to a gap, and a battery pack and a vehicle including the battery module.

BACKGROUND ART

In a battery module having a structure inserted into a module frame in a state where a bus bar frame assembly and a cell stack are combined, a gap of a certain level or above is inevitably formed between the combined body of the bus bar frame assembly and the cell stack and an inner surface of the module frame.

If the gap is reduced or eliminated, the battery module may have better quality when completed, but the process of inserting the combined body in which the bus bar frame assembly and the cell stack are combined into the module frame becomes substantially impossible. In addition, even if the combined body is difficultly inserted into the module frame, components may be damaged during the insertion process due to interference/friction between the module frame and the combined body in which the bus bar frame assembly and the cell stack are combined.

For this reason, an insertion portion of the module frame must be formed to have a slightly larger size than the combined body in which the bus bar frame assembly and the cell stack are combined. In this case, the combined body in which the bus bar frame assembly and cell stack are combined is easily inserted into the module frame, which may improve the process efficiency and reduce the possibility of product damage by minimizing interference between components during insertion. However, due to the gap formed between the combined body of the bus bar frame assembly and the cell stack and the inner wall of the module frame, the bus bar frame is inevitably shaken.

If the bus bar frame is moved inside the module frame, the position of a bus bar disposed on the bus bar frame and the position of an electrode lead coupled to the bus bar are not kept constant, and thus the product specifications may not be maintained as intended in designing. In addition, if the electrode lead and the bus bar move relative to each other due to the movement of the bus bar frame, the bonding portion between the electrode lead and the bus bar may be damaged, which may cause product defects.

Thus, it is urgently needed to develop a battery module with an improved structure, which allows the combined body in which the bus bar frame assembly and the cell stack are combined to be easily inserted into the module frame and also prevents the bus bar frame from being shaken inside the module frame after the insertion.

DISCLOSURE

Technical Problem

The present disclosure is designed to solve the problems of the related art, and therefore the present disclosure is directed to providing a battery module with an improved structure, which may allow a combined body in which a bus bar frame assembly and a cell stack are combined to be easily inserted into a module frame and also prevent a bus bar frame from being shaken inside the module frame after the insertion.

However, the technical problem to be solved by the present disclosure is not limited to the above, and other objects not mentioned herein will be understood from the following description by those skilled in the art.

Technical Solution

In one aspect of the present disclosure, there is provided a battery module, comprising: a cell stack formed by stacking a plurality of battery cells; a bus bar frame assembly having a front bus bar frame configured to cover one longitudinal side of the cell stack, a rear bus bar frame configured to cover another longitudinal side of the cell stack, and an upper cover configured to cover at least a portion of an upper surface of the cell stack; and a module frame coupled to the bus bar frame assembly to accommodate the cell stack and the bus bar frame assembly, wherein the front bus bar frame includes at least one first upper guide formed to protrude at an upper end thereof and at least one first side guide formed to protrude at a side portion thereof, and the rear bus bar frame includes at least one second upper guide formed to protrude at an upper end thereof and at least one second side guide formed to protrude at a side portion thereof.

The at least one first upper guide may be interposed between the upper end of the front bus bar frame and an inner surface of the module frame, the at least one first side guide may be interposed between the side portion of the front bus bar frame and the inner surface of the module frame, the at least one second upper guide may be interposed between the upper end of the rear bus bar frame and the inner surface of the module frame, and the at least one second side guide may be interposed between the side portion of the rear bus bar frame and the inner surface of the module frame.

The front bus bar frame may be hinged to one longitudinal end of the upper cover, and the rear bus bar frame may be hinged to another longitudinal end of the upper cover.

The upper cover may have a plurality of guide accommodation grooves configured to accommodate the at least one first upper guide and the at least one second upper guide, respectively.

Each of the plurality of guide accommodation grooves may have a notch form dented inward from either the one longitudinal end or the another longitudinal end of the upper cover.

Each of the plurality of guide accommodation grooves may be formed to have a depth corresponding to a protruding height of the at least one first upper guide or the at least one second upper guide which the guide accommodation groove is configured to accommodate so that the at least one first upper guide and the at least one second upper guide do not interfere with the upper cover when the front bus bar frame and the rear bus bar frame are pivoted and unfolded to be parallel to the upper cover.

The at least one first upper guide and the at least one second upper guide each may have an inclined surface formed by chamfering a respective top edge thereof.

The inclined surface formed at the at least one first upper guide and the inclined surface formed at the at least one second upper guide may be oriented in the same direction.

The inclined surface formed at the at least one first upper guide and the inclined surface formed at the at least one second upper guide may be oriented toward one longitudinal side or another longitudinal side of the battery module.

In other aspects of the present disclosure, there are also provided a battery pack and a vehicle, which each comprise the battery module according to an embodiment of the present disclosure.

Advantageous Effects

According to an embodiment of the present disclosure, the combined body in which the bus bar frame assembly and the cell stack are combined may be easily inserted into the module frame, and also the bus bar frame may be prevented from being shaken inside the module frame after the insertion.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
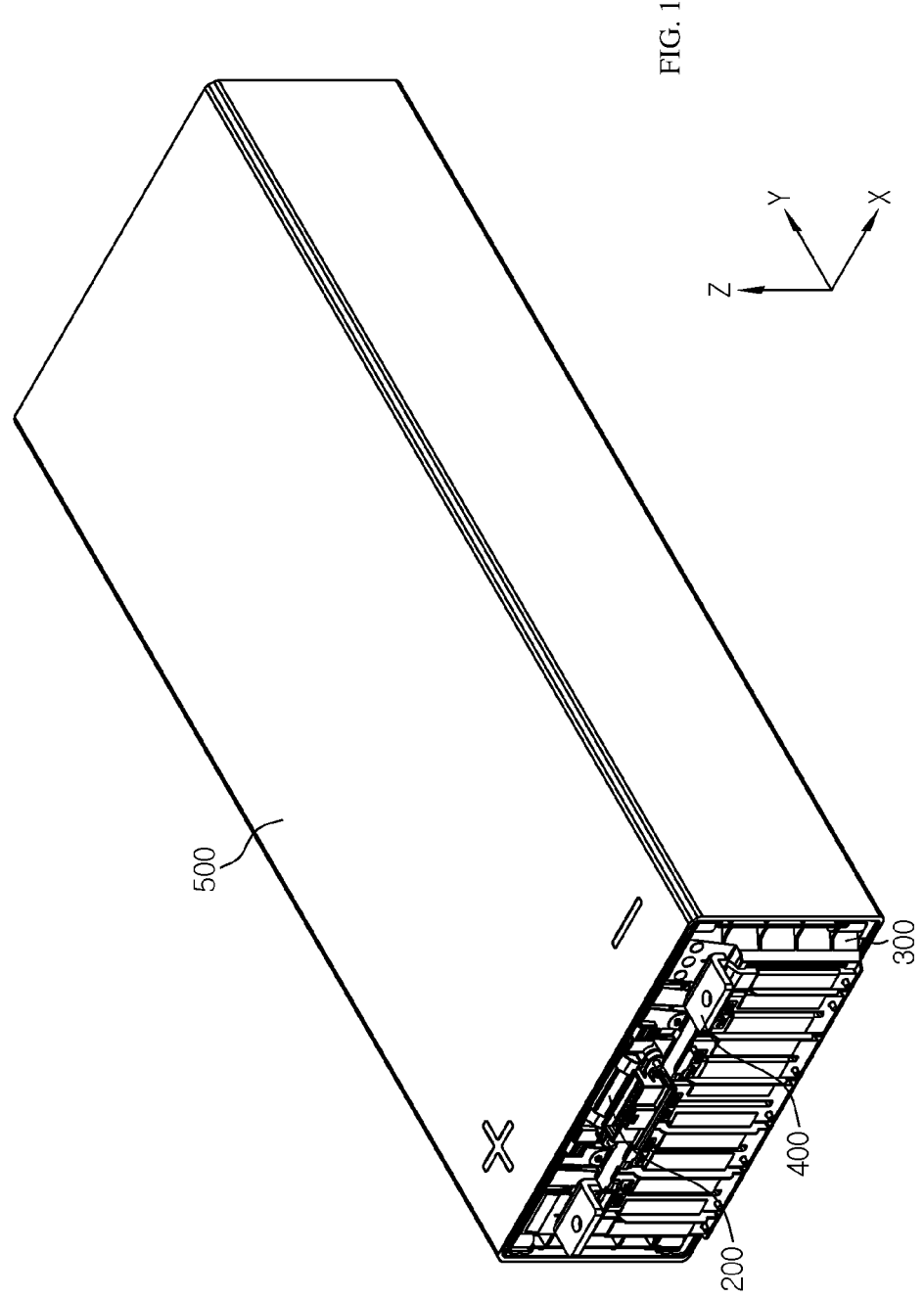
FIG. 1 is a perspective view showing a battery module according to an embodiment of the present disclosure.
Figure 2:
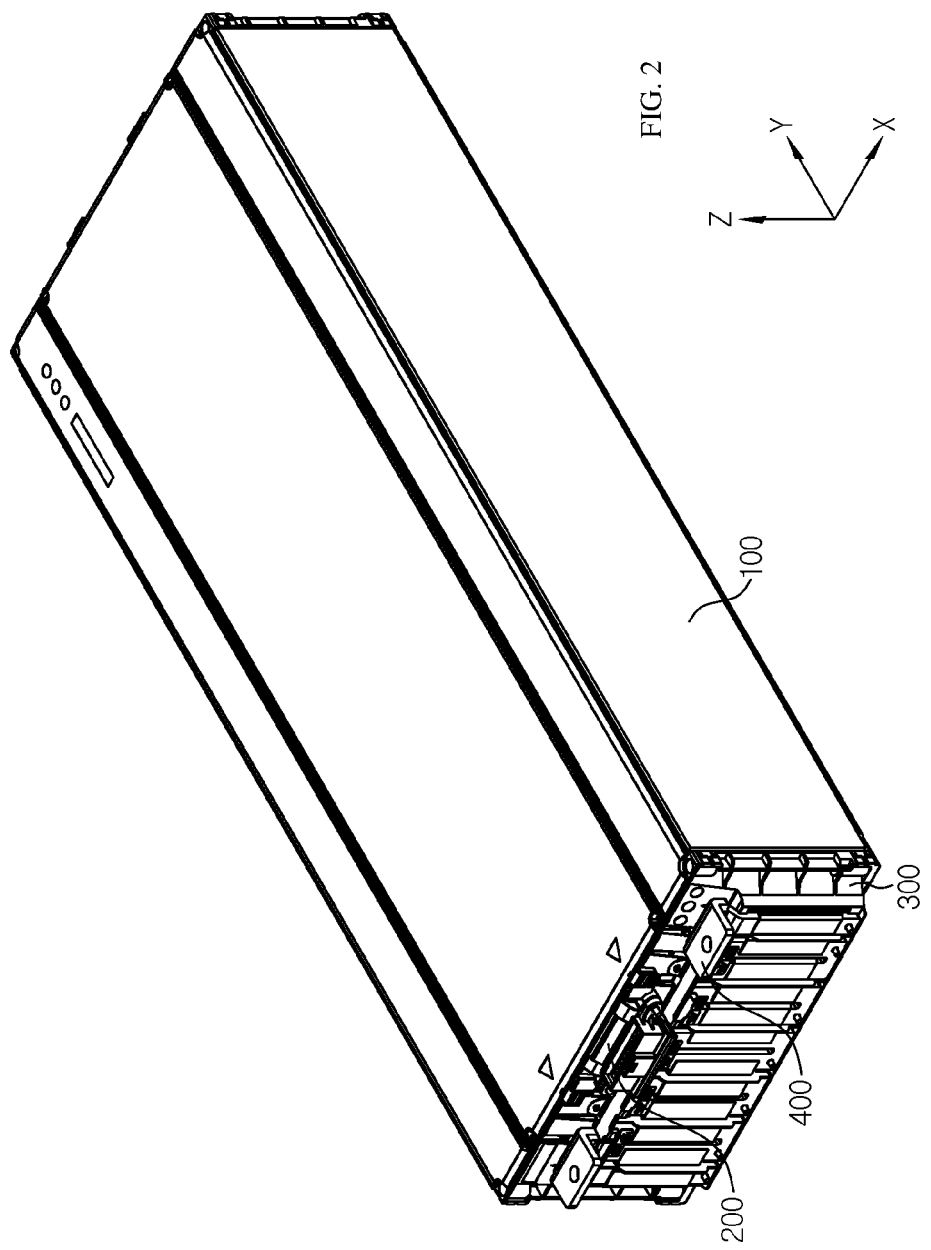
FIG. 2 is a diagram showing a state where a module frame is removed, in the battery module of FIG. 1
Figure 3:
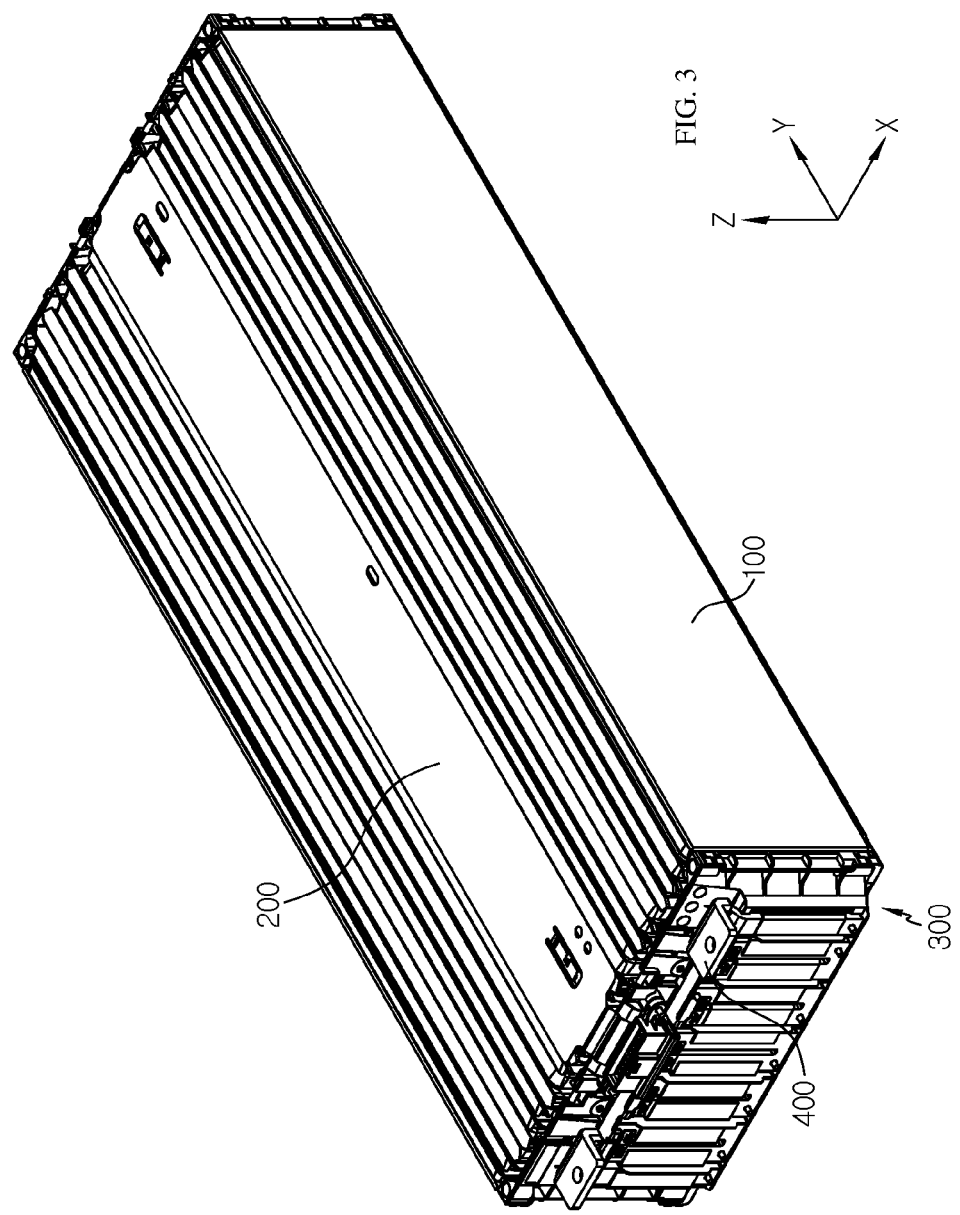
FIG. 3 is a diagram showing a state where an upper cover is removed, in the battery module of FIG. 2.

First, referring to FIGS. 1 to 3, a battery module according to an embodiment of the present disclosure may be implemented to include a cell stack 100, a FPCB assembly 200, a bus bar frame assembly 300, a module terminal 400 and a module frame 500.

Figure 4:
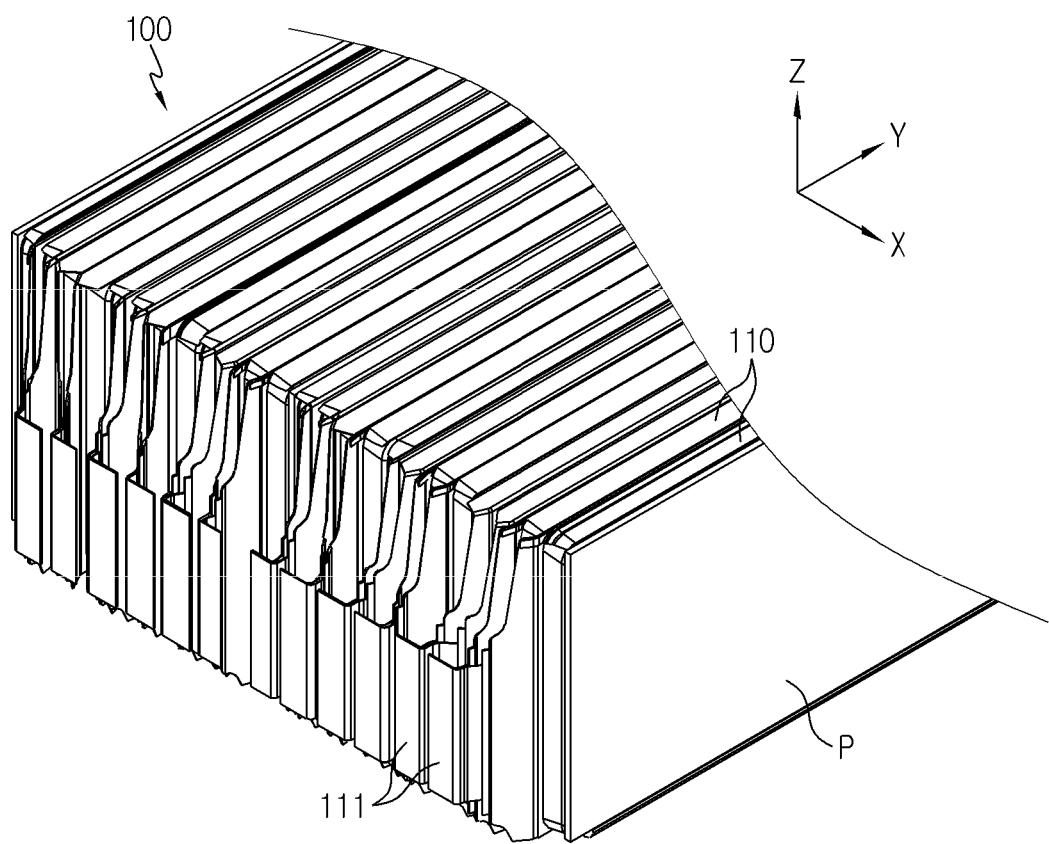
FIG. 4 is a diagram showing a part of a cell stack applied to the battery module according to an embodiment of the present disclosure.

Referring to FIG. 4, the cell stack 100 includes a plurality of battery cells 110 stacked to face each other at wide surfaces thereof. The cell stack 100 may include at least one buffer pad P interposed at an outermost battery cell 110 and/or between adjacent battery cells 110.

That is, referring to FIG. 4 along with FIGS. 1 to 3, the cell stack 100 may be inserted into the module frame 500 in a state of being coupled with the FPCB assembly 200, the bus bar frame assembly 300 and the module terminal 400. At this time, in order to insert the cell stack 100 easily while securing a maximum volume of the cell stack 100, the buffer pad P made of an elastic material such as a sponge may be additionally applied.

Figure 5:
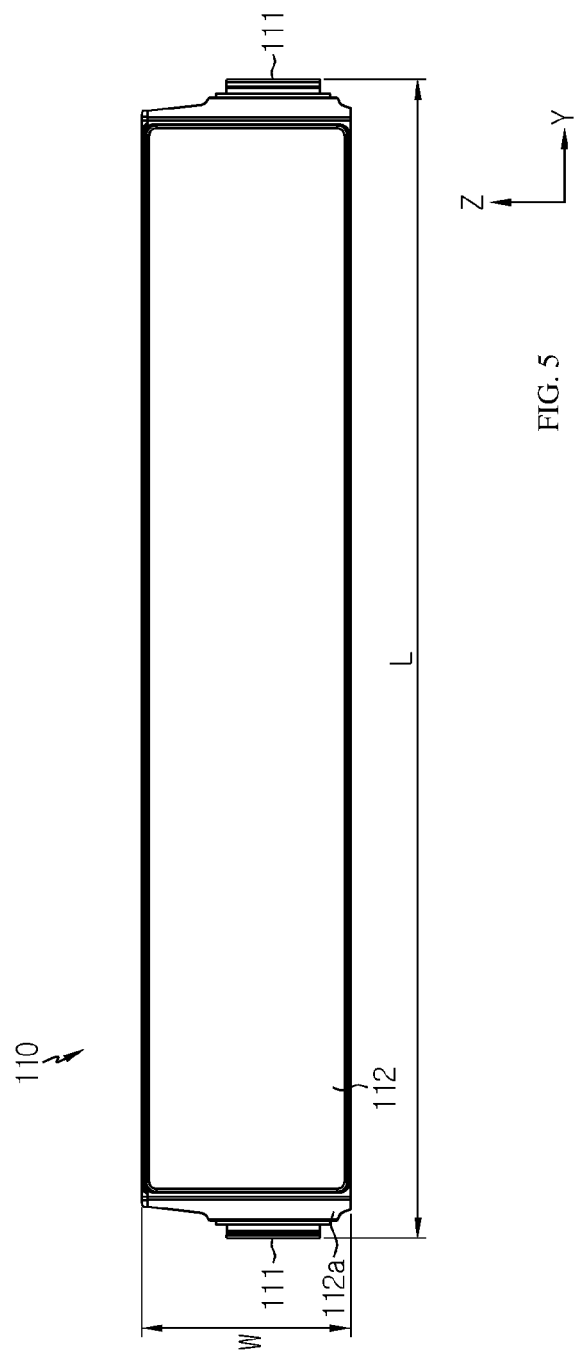
FIG. 5 is a plan view showing individual battery cells constituting the cell stack of FIG. 4.

Referring to FIG. 5, a pouch-type battery cell may be applied as the battery cell 110. As shown in FIG. 4, the pouch-type battery cell 110 includes an electrode assembly (not shown), a pair of electrode leads 111 and a cell case 112.

Although not shown in the drawings, the electrode assembly has a form in which separators are interposed between positive electrode plates and negative electrode plates that are repeatedly stacked alternately, and separators are preferably positioned at both outermost sides for insulation, respectively.

The positive electrode plate includes a positive electrode current collector and a positive electrode active material layer coated on one side of the positive electrode current collector, and a positive electrode uncoated region not coated with a positive electrode active material is formed at one side end of the positive electrode plate. The positive electrode uncoated region functions as a positive electrode tab.

The negative electrode plate includes a negative electrode current collector and a negative electrode active material layer coated on one surface or both sides of the negative electrode current collector, and a negative electrode uncoated region not coated with a negative electrode active material is formed at one side end of the negative electrode plate. The negative electrode uncoated region functions as a negative electrode tab.

In addition, the separator is interposed between the positive electrode plate and the negative electrode plate to prevent electrode plates having different polarities from directly contacting each other. The separator may made of a porous material so that ions may be moved using the electrolyte as a medium between the positive electrode plate and the negative electrode plate.

The pair of electrode leads 111 are connected to the positive electrode tab (not shown) and the negative electrode tab (not shown), respectively, and are drawn out of the cell case 112. The pair of electrode leads 111 are drawn out at one longitudinal side and the other longitudinal side of the battery cell 110, respectively. That is, the battery cell 110 applied to the present disclosure corresponds to a bidirectional draw-out battery cell in which the positive electrode lead and the negative electrode lead are drawn in opposite directions.

In addition, the pair of electrode leads 111 are positioned to be biased to one side from a center of the battery cell 110 in a width direction (the Z-axis direction of FIGS. 4 and 5). Specifically, the pair of electrode leads 111 are positioned to be biased to one side from the center of the battery cell 110 in the width direction, preferably to be biased downward along the height direction (the Z-axis direction of FIG. 4) of the cell stack 100.

If the pair of electrode leads 111 are positioned to be biased to one side from the center of the battery cell 110 in the width direction as described above, it is possible to give a space for installation of a connector 240, explained later, and the module terminal 400 so that the energy density of the battery module is improved. The increase in energy density due to the structure in which the electrode lead 111 is installed to be biased will be described in detail later.

The cell case 112 includes two regions, namely an accommodation portion accommodating the electrode assembly and a sealing portion extending in a circumferential direction of the accommodation portion and thermally fused in a state where the electrode lead 111 is drawn out to seal the cell case 112.

Although not shown in the figures, the cell case 112 is sealed by affixing and thermally fusing edge portions of an upper case and a lower case made of a multi-layered pouch film in which a resin layer, a metal layer and a resin layer are stacked in order.

In the sealing portion, a terrace portion 112a corresponding to a region located in the direction in which the electrode lead 111 is drawn out has a tapered shape such that both sides of the terrace portion 112a are cut so that the width thereof is gradually reduced along the drawing direction of the electrode lead 111. As described above, if the width of the terrace portion 112a is gradually reduced toward the outer side of the battery cell 110, the electrode lead 111 may be disposed to be biased, and the energy density of the battery module may be improved.

Meanwhile, the battery cell 110 applied to the present disclosure is a long cell where a ratio of length (L) to width (W) is about 3 or more and 12 or less. In the battery module according to the present disclosure, if the long cell type battery cell 110 is employed, it is possible to improve the capacity of the battery module while minimizing the increase in the height of the battery module, which makes it easy to install the battery module at a lower part of a seat or a trunk of a vehicle.

Figure 6:
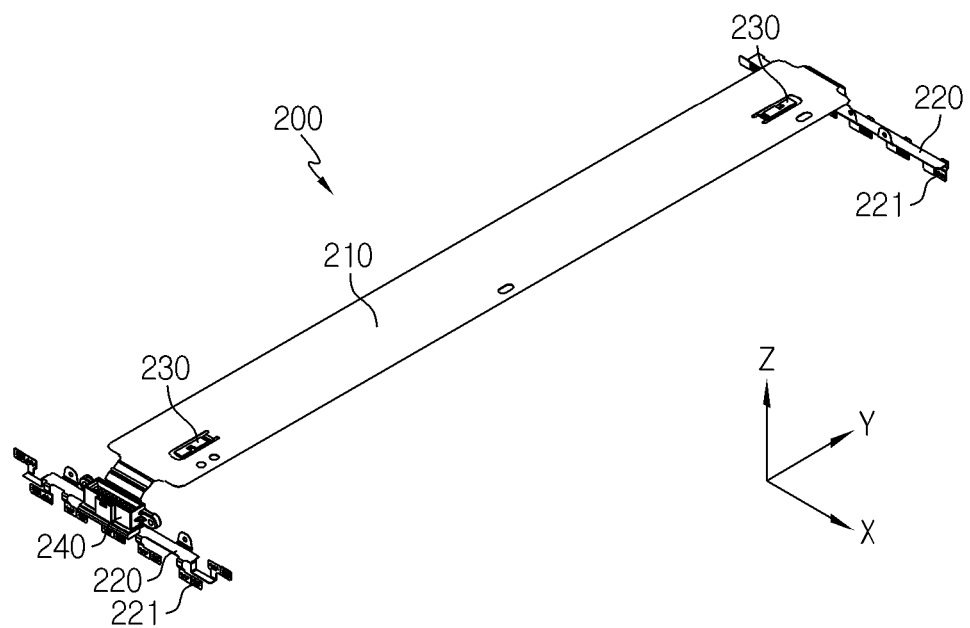
FIG. 6 is a perspective view showing a FPCB assembly applied to the battery module according to an embodiment of the present disclosure.
Figure 8:
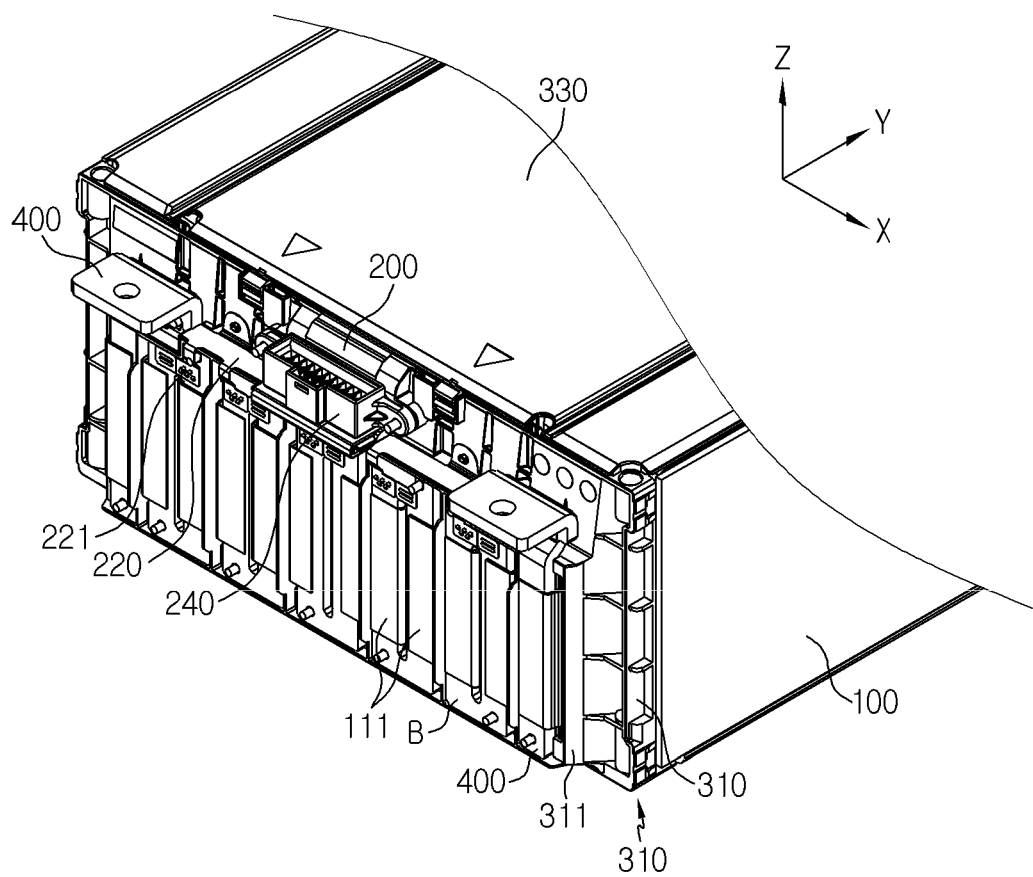
FIG. 8 is a partially enlarged view showing a part of the battery module of FIG. 2.

Next, referring to FIGS. 6 and 8 along with FIG. 3, the FPCB assembly 200 may be implemented to include a first FPCB 210, a second FPCB 220, a temperature sensor 230 and a connector 240. In the present disclosure, the first FPCB 210 and the second FPCB 220 are described as components distinguished from each other, but the first FPCB 210 and the second FPCB 220 may be a single integrated flexible printed circuit board (FPCB). That is, the first FPCB 210 and the second FPCB 220 are just elements that are distinguished according to positions where they are disposed.

The first FPCB 210 extends along the longitudinal direction of the cell stack 100 (the Y-axis direction of FIG. 3) to cover at least a portion of the upper surface of the cell stack 100. The longitudinal ends of the first FPCB 210 are provided with a temperature sensor placing portion formed by cutting a portion of the first FPCB 210.

The temperature sensor 230 is mounted to the upper surface of the temperature sensor placing portion, whereby the temperature sensor 230 is installed at positions corresponding to both ends of the cell stack 100 in the longitudinal direction (parallel to the Y-axis of FIG. 3). In addition, the temperature sensor placing portion is installed at a position corresponding to the center of the cell stack 100 in the width direction (a direction parallel to the X-axis of FIG. 3).

The position where the temperature sensor 230 is formed is selected to sense a temperature of a portion with the highest temperature in the cell stack 100. The FPCB assembly 200 may be connected to a control device that may control charging and discharging of the battery module, such as a battery management system (BMS). If the temperature of the battery module rises above a reference value, in order to ensure safety in use of the battery module, it is preferable to measure the temperature at a location with the highest temperature to control charging and discharging.

Thus, in the longitudinal direction of the cell stack 100 (the Y-axis direction of FIG. 3), both longitudinal ends closest to the electrode lead 111 become optimal positions, and in the width direction of the cell stack 100 (the X-axis direction of FIG. 3), the center where heat dissipation is most difficult becomes an optimal position.

Referring to FIGS. 3, 6 and 8 together, the second FPCB 220 is provided in a pair, and the second FPCBs 220 extend from both longitudinal ends of the first FPCB 210 and are electrically connected to a bus bar B, explained later, respectively. That is, the second FPCB 220 has a plurality of connection terminals 221 formed at several branched ends, and the plurality of connection terminals 221 are connected to a plurality of bus bars B, explained later.

Meanwhile, the connector 240 is mounted on the second FPCB 220, and the connector 240 is electrically connected to the connection terminal 221 through the second FPCB 220. As described above, a control device (not shown) such as BMS is connected to the connector 240, and the control device receives information about a voltage of the battery cell 110 transmitted through the bus bar B and the connection terminal 221, information about a temperature of the cell stack 100 measured through the temperature sensor 230, or the like, and controls charging and discharging of the battery module with reference to the information.

Meanwhile, as shown in FIG. 8, the connector 240 mounted on the second FPCB 220 faces a front surface (a surface parallel to the X-Z plane of FIG. 8) of the cell stack 100 but is installed in a space formed above the electrode lead 111 due to biasing of the electrode lead 111. That is, the connector 240 is installed to face an upper portion of the front surface of the cell stack 100.

As such, the connector 240 is installed in the space provided due to the structure in which the electrode lead 111 is installed to be biased, which minimizes the overall volume increase of the battery module caused by the installation of the connector 240, thereby improving energy density.

Figure 7:
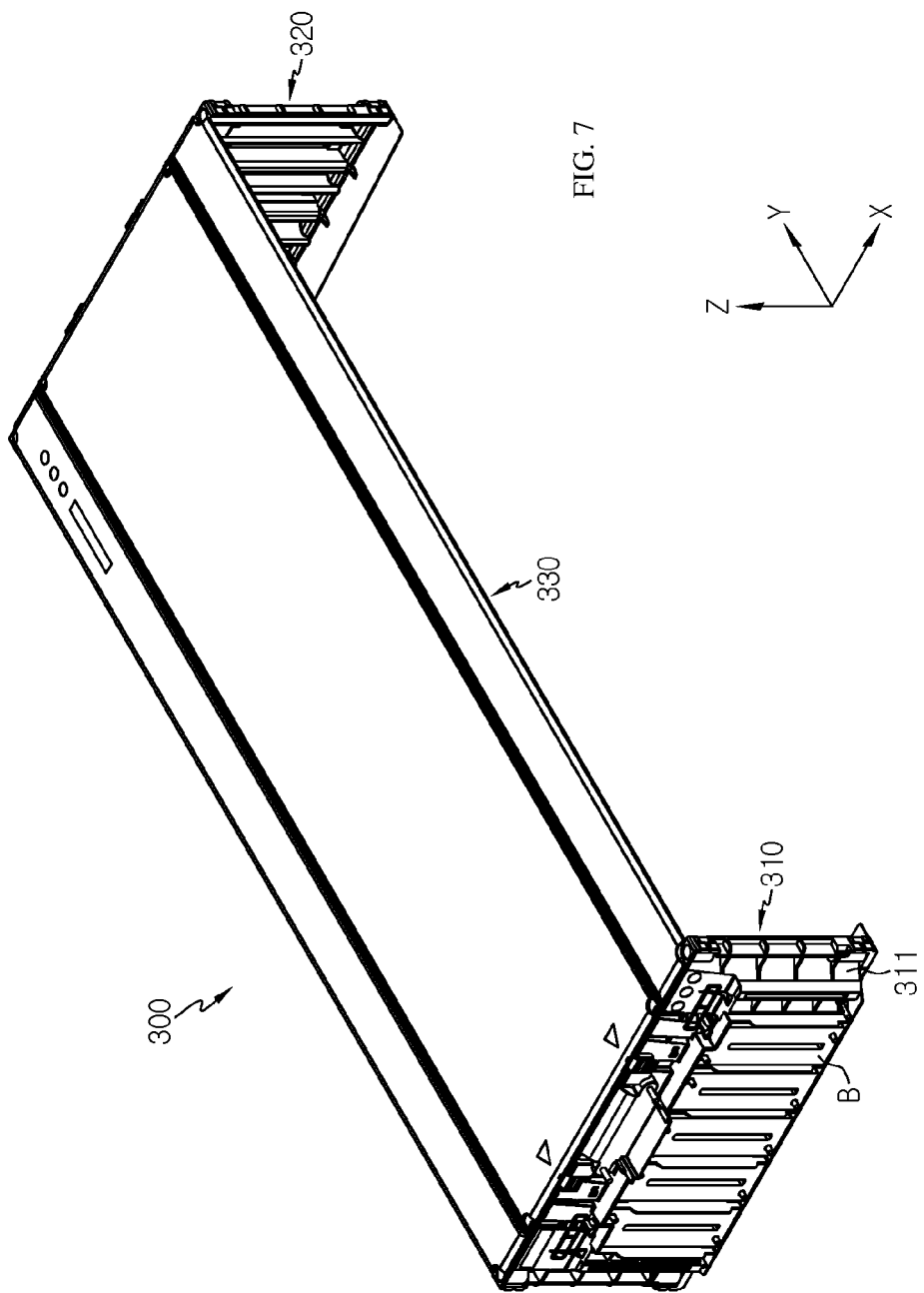
FIG. 7 is a perspective view showing a bus bar frame assembly applied to the battery module according to an embodiment of the present disclosure.

Next, referring to FIGS. 7 and 8, the bus bar frame assembly 300 may be implemented to include a front bus bar frame 310, a rear bus bar frame 320, an upper cover 330 and a bus bar B.

The front bus bar frame 310 is hinged to one end of the upper cover 330 in the longitudinal direction (a direction parallel to the Y-axis of FIG. 7) to be pivotable relative to the upper cover 330. Likewise, the rear bus bar frame 320 is hinged to the other longitudinal end of the upper cover 330 to be pivotable relative to the upper cover 330.

Figure 9:
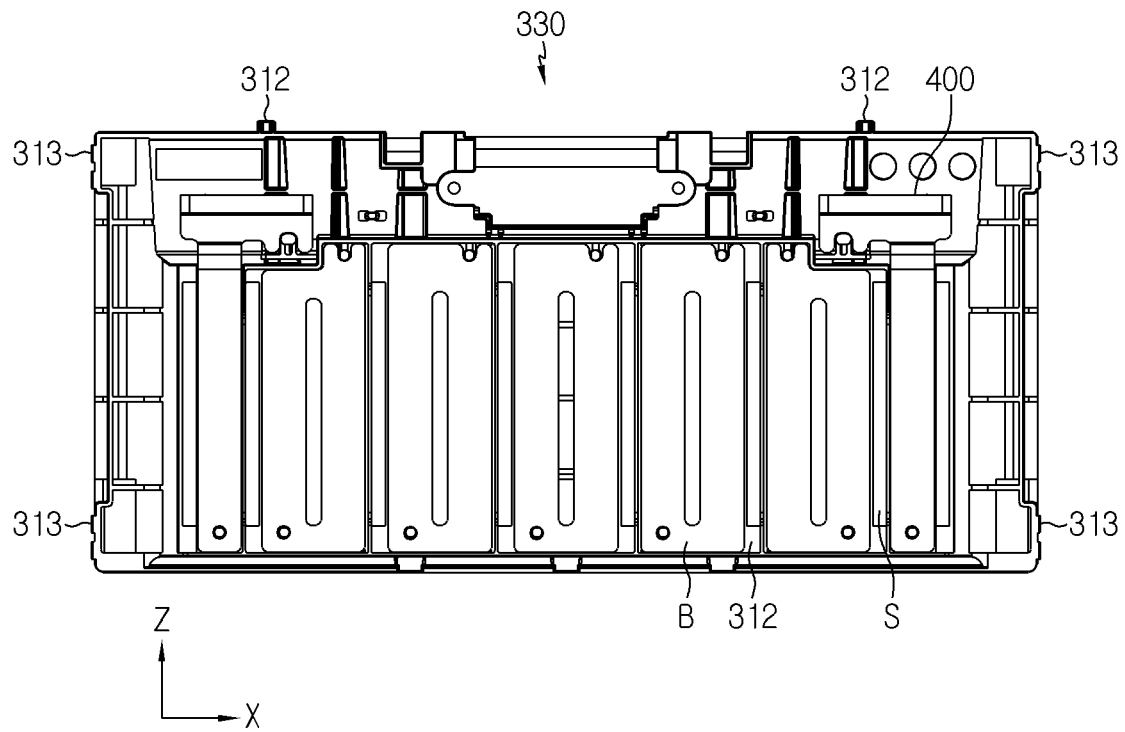
FIG. 9 is a front view showing a front bus bar frame applied to the battery module according to an embodiment of the present disclosure.

Referring to FIG. 9 along with FIGS. 7 and 8, the bus bar frame 310, for example, may be made of an insulating material such as resin, and includes a bus bar placing portion 311 formed to protrude at a position corresponding to electrode leads 111 of the battery cell 110. A plurality of bus bars B are fixed and installed on the bus bar placing portion 311. The bus bar placing portion 311 is formed at a position biased downward from the center of the cell stack 100 in the height direction (the Z-axis direction of FIGS. 7 and 8), like the electrode lead 111. The biasing of the bus bar placing portion 311 is to secure a space for installing components, similar to the biasing of the electrode lead 111.

The bus bar placing portion 311 has a plurality of lead slits S formed at positions corresponding to the electrode leads 111. Through the lead slits S, the electrode leads 111 are drawn out of the front bus bar frame 310, and the drawn electrode leads 111 are bent and fixed by welding or the like on the bus bar B.

Figure 10:
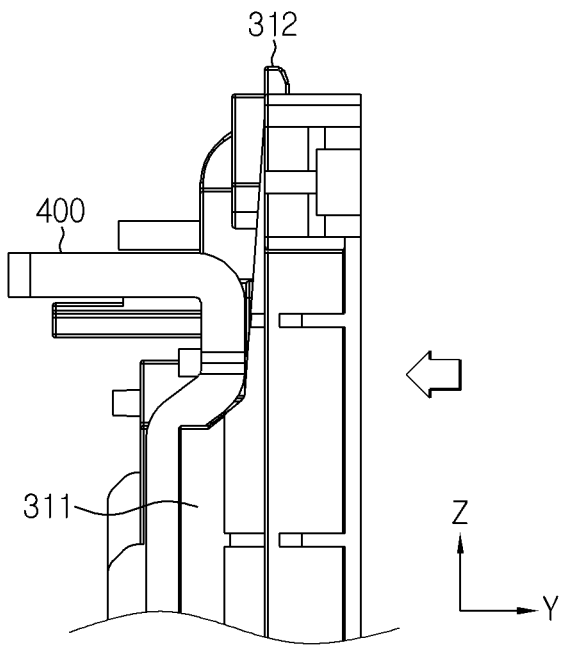
FIG. 10 is a side view showing the front bus bar frame of FIG. 9.
Figure 11:
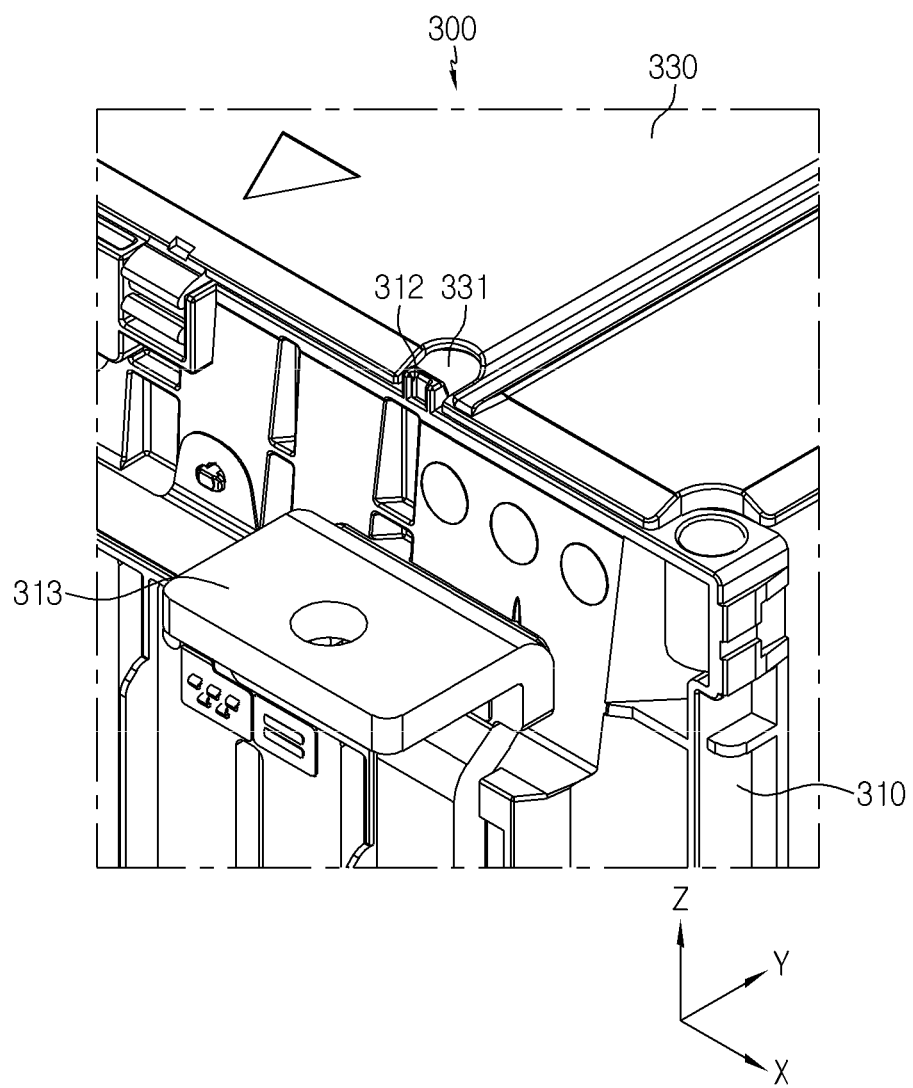
FIG. 11 is a partially enlarged view showing a part of the bus bar frame assembly of FIG. 7.

Referring to FIGS. 9 to 11, the front bus bar frame 310 includes at least one first upper guide 312 protruding at an upper end thereof and at least one first side guide 313 protruding at a side portion thereof.

Figure 14:
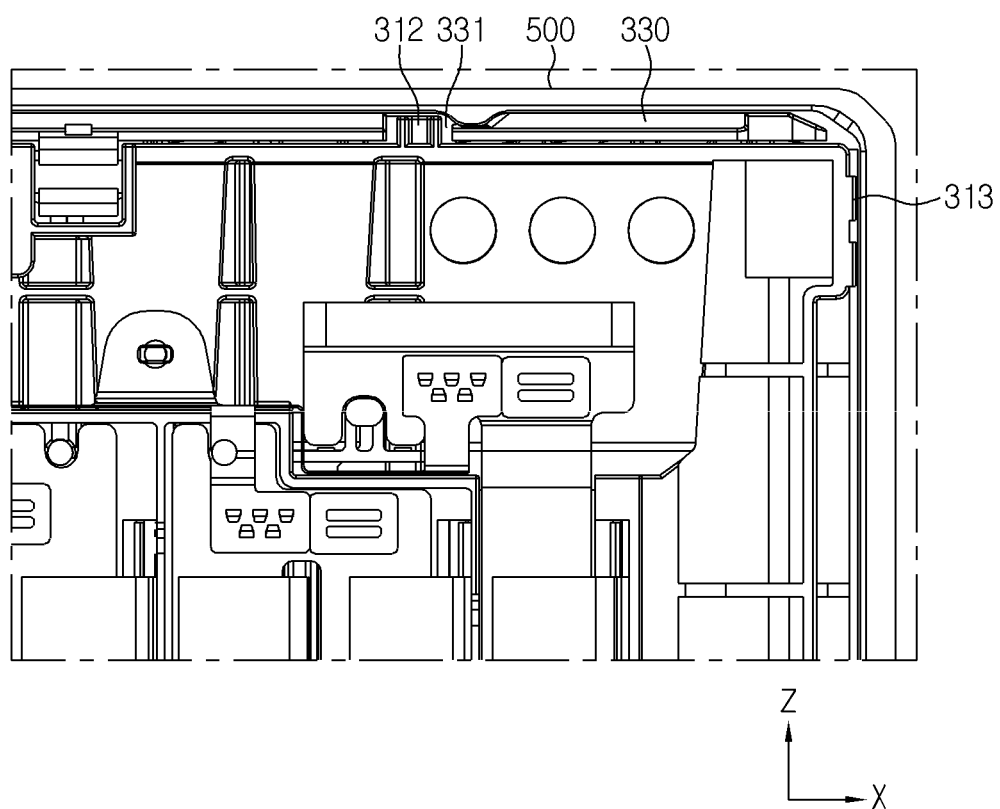
FIG. 14 is a partially enlarged view showing the battery module according to an embodiment of the present disclosure at the front.

Referring to FIG. 14 along with FIGS. 8 and 9, the first upper guide 312 is interposed between the upper end of the front bus bar frame 310 and the inner surface of the module frame 500, thereby minimizing that the front bus bar frame 310 is shaken inside the module frame 500 in the vertical direction (a direction parallel to the Z-axis of FIG. 14).

The front bus bar frame 310 is hinged to the upper cover 330 as described above, and a gap may exist in the hinged portion, whereby the front bus bar frame 310 may move. As described above, if movement occurs in the front bus bar frame 310, the coupling portion between the bus bar B and the electrode lead 111 provided in the bus bar frame 310 may be damaged, and the product specifications may not be maintained as intended in designing. It can cause problems that cannot be. The first upper guide 312 can minimize the vertical movement of the front bus bar frame 310, thereby preventing this problem from occurring.

Meanwhile, the first upper guide 312 is preferably provided in at least one pair. That is, at least one first upper guide 312 may be provided at each of both sides based on the center of the front bus bar frame 310 in the longitudinal direction (a direction parallel to the X-axis of FIG. 9) for stable fixing of the front bus bar frame 310.

Referring to FIG. 10, the first upper guide 312 has an inclined surface formed by chamfering a top edge thereof. When a combined body including the cell stack 100, the FPCB assembly 200 and the bus bar frame assembly 300 is inserted into the module frame 500, the inclined surface allows the combined body to be naturally inserted. The insertion of the module frame 500 is performed along the arrow direction.

The inclined surface provided to the first upper guide 312 may be formed to face one side or the other side of the battery module in the longitudinal direction (a direction parallel to the Y-axis of FIG. 10). The figures of the present disclosure just show the case where the inclined surface provided to the first upper guide 312 is formed to face the rear side of the battery module, but it just assumes that the module frame 500 is coupled from the rear side of the battery module toward the front side thereof, and the location where the inclined surface of the first upper guide 312 is formed is not limited thereto.

Referring to FIG. 14 along with FIGS. 8 and 9, the first side guide 313 is interposed between the side portion of the front bus bar frame 310 and the inner surface of the module frame 500, thereby minimizing that the front bus bar frame 310 is shaken in the left and right direction (a direction parallel to the X-axis of FIG. 14) inside the module frame 500.

The front bus bar frame 310 is hinged to the upper cover 330 as described above, and a gap may exist in the hinged portion, whereby the front bus bar frame 310 may move. If movement occurs in the front bus bar frame 310 as described above, the coupling portion between the bus bar B and the electrode lead 111 provided to the bus bar frame 310 may be damaged, and the product specifications may not be maintained as intended in designing. The first side guide 313 may minimize the movement of the front bus bar frame 310 in the left and right direction, thereby preventing the above problem from occurring.

Meanwhile, it is preferable that the first side guide 313 is provided in at least two pairs. That is, the first upper guide 312 is formed on one longitudinal side and the other longitudinal side of the front bus bar frame 310 for stable fixing of the front bus bar frame 310, respectively, and at least one first upper guide 312 may also be provided to both sides based on the center of the front bus bar frame 310 in the height direction (a direction parallel to the Z-axis of FIG. 9), respectively.

Figure 12:
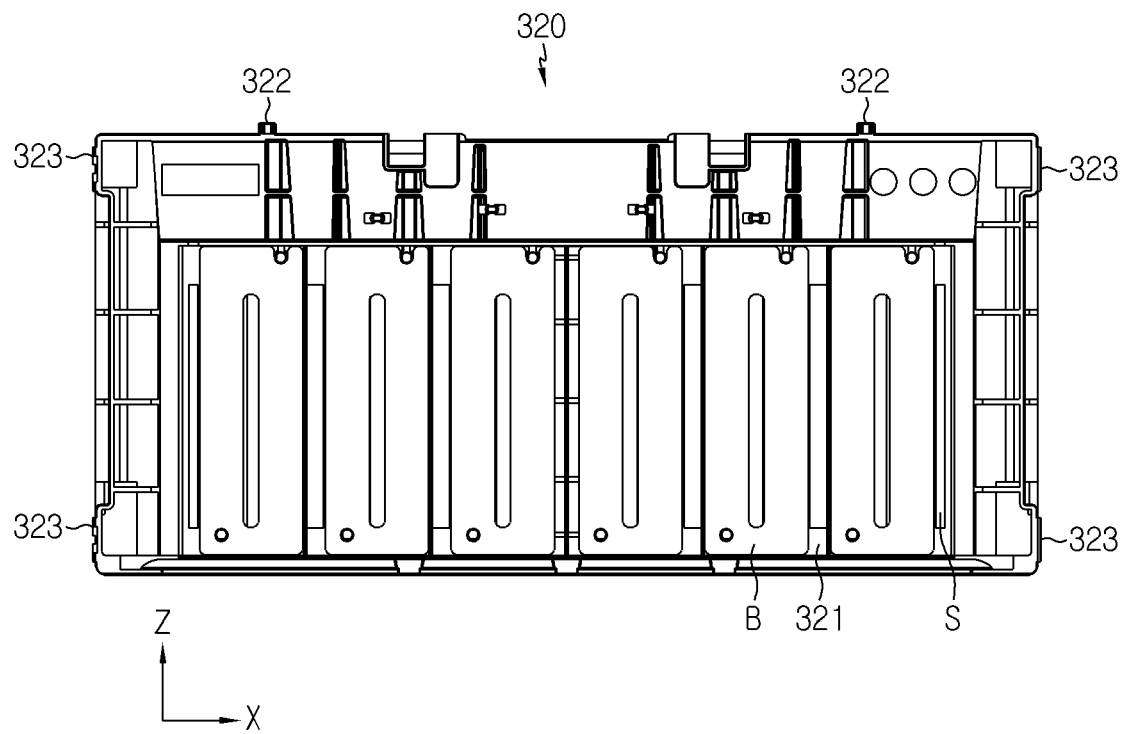
FIG. 12 is a front view showing a rear bus bar frame applied to the battery module according to an embodiment of the present disclosure.

Next, referring to FIG. 12 along with FIGS. 7 and 8, similar to the front bus bar frame 310 described above, the rear bus bar frame 320 may be made of an insulating material, for example resin, and has a bus bar placing portion 321 formed to protrude at a position corresponding to the electrode leads 111 of the battery cell 110. A plurality of bus bars B are fixedly installed on the bus bar placing portion 321. The bus bar placing portion 321 is formed at a position biased downward from the center of the cell stack 100 in the height direction (a direction parallel to the Z-axis of FIGS. 7 and 12), like the electrode lead 111.

The bus bar placing portion 321 has a plurality of lead slits S formed at positions corresponding to the electrode leads 111. The electrode leads 111 are drawn out of the rear bus bar frame 320 through the lead slits S, and the drawn electrode leads 111 are bent and fixed by welding or the like on the bus bar B.

Figure 13:
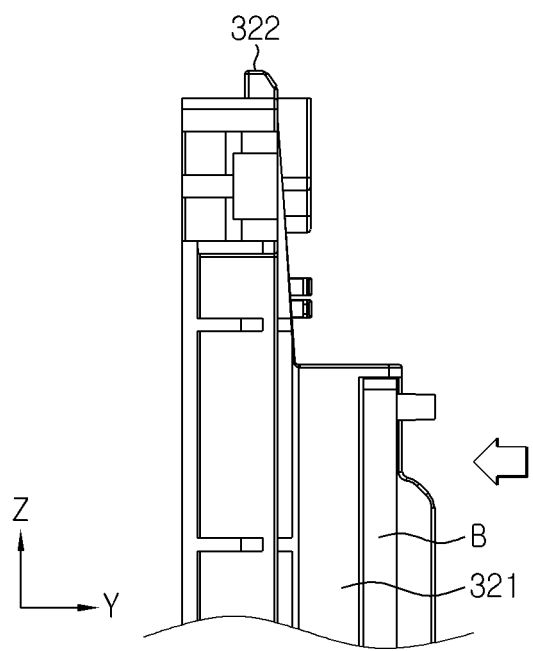
FIG. 13 is a side view showing the rear bus bar frame of FIG. 12.

Referring to FIGS. 12 and 13, the rear bus bar frame 320 includes at least one second upper guide 322 protruding at an upper end thereof and at least one second side guide 323 protruding at a side portion thereof.

Like the first upper guide 312 described above, the second upper guide 322 is interposed between the upper end of the rear bus bar frame 320 and the inner surface of the module frame 500, thereby minimizing that the rear bus bar frame 320 is shaken inside the module frame 500 in the vertical direction (a direction parallel to the Z-axis of FIG. 12).

The rear bus bar frame 320 is hinged to the upper cover 330 as described above, and a gap may exist in the hinged portion, whereby the rear bus bar frame 320 may move. If movement occurs in the rear bus bar frame 320 as described above, the coupling portion between the bus bar B and the electrode lead 111 provided to the bus bar frame 320 may be damaged, and the product specifications may not be maintained as intended in designing. The second upper guide 322 may minimize the vertical movement of the rear bus bar frame 320, thereby preventing the above problem from occurring.

Meanwhile, the second upper guide 322 is preferably provided in at least one pair. That is, at least one second upper guide 322 may be provided to each of both sides based on the center of the rear bus bar frame 320 in the longitudinal direction (a direction parallel to the X-axis of FIG. 12) for stable fixation of the rear bus bar frame 320.

Referring to FIG. 13, the second upper guide 322 has an inclined surface formed by chamfering a top edge thereof. When the combined body including the cell stack 100, the FPCB assembly 200 and the bus bar frame assembly 300 is inserted into the module frame 500, the inclined surface allows natural insertion. The insertion of the module frame 500 follows the arrow direction.

The inclined surface provided to the second upper guide 322 may be oriented toward one side or the other side of the battery module in the longitudinal direction (a direction parallel to the Y-axis of FIG. 13). The inclined surface formed at the second upper guide 322 is oriented in the same direction as the inclined surface formed at the first upper guide 312.

The figures of the present disclosure show only the case where the inclined surface provided to the second upper guide 322 is formed to face the rear side of the battery module, but it just assumes that the module frame 500 is coupled from the rear side of the battery module toward the front side thereof, and the location at which the inclined surface of the second upper guide 322 is formed is not limited thereto.

Referring to FIGS. 8 and 11, the upper cover 330 is connected to the front bus bar frame 310 and the rear bus bar frame 320 through a hinge coupling and covers the upper surface of the cell stack 100 (a surface parallel to the X-Y plane of FIG. 8).

As shown in FIG. 11, the upper cover 330 includes a plurality of guide accommodation grooves 331 formed at positions corresponding to the first upper guide 312 and the second upper guide 322. Each guide accommodation groove 331 has a notch form dented inward from a side end of the upper cover 330 at which the accommodation groove 331 is located in the longitudinal direction (a direction parallel to the Y-axis of FIG. 11).

The guide accommodation grooves 331 are formed so that the first upper guide 312 and the second upper guide 322 do not interfere with the upper cover 330 when the front bus bar frame 310 and the rear bus bar frame 320 are pivoted based on their hinged portions and unfolded to be parallel to the upper cover 330. As such, in view of the purpose of avoiding interference, the guide accommodation groove 331 is formed to have a depth corresponding to the protruding height of the first upper guide 312 and the second upper guide 322.

Figure 15:
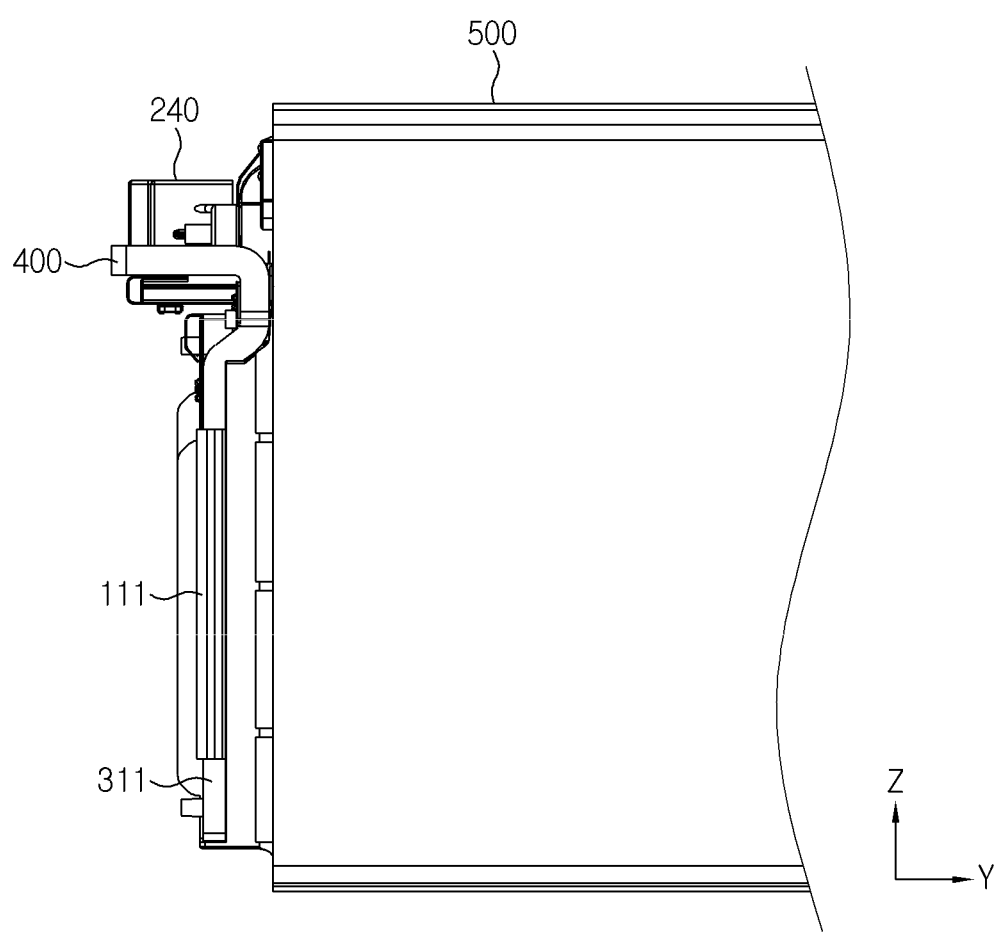
FIG. 15 is a partially enlarged view showing the battery module according to an embodiment of the present disclosure at the side.

Referring to FIG. 15 along with FIG. 8, the module terminal 400 is provided in a pair, and the module terminals 400 are respectively connected to the electrode leads 111 located at outsides of the both sides of the cell stack 100 in the width direction (a direction parallel to the X-axis of FIG. 8) among the electrode leads 111.

Like the connector 240 described above, the module terminal 400 is located in the space formed above the electrode lead 111 and the bus bar placing portion 311 due to the biasing of the electrode lead 111. The location where the module terminal 400 is formed may minimize the overall volume increase of the battery module caused by installing the module terminal 400 since it utilizes the space formed by the biased installation of the electrode lead 111.

Figure 16:
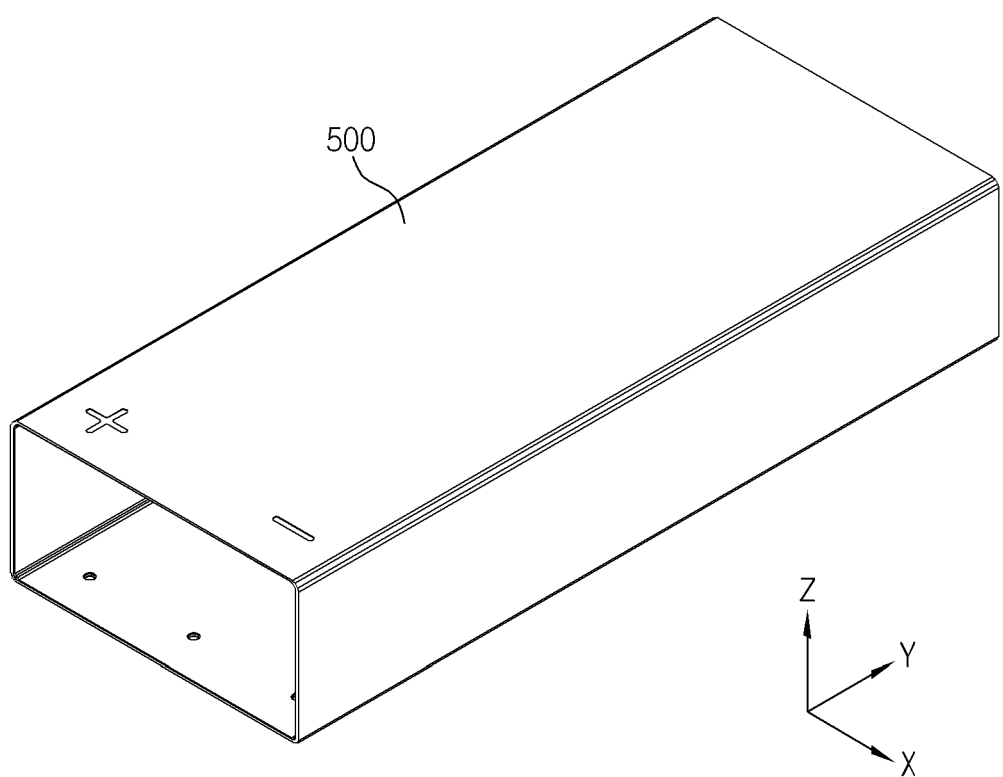
FIG. 16 is a perspective view showing a module frame applied to the battery module according to an embodiment of the present disclosure.

Referring to FIG. 16 along with FIG. 1, the module frame 500 accommodates a combined body formed by combining the cell stack 100, the FPCB assembly 200, the bus bar frame assembly 300 and the module terminal 400. The module frame 500 may be coupled to the bus bar frame assembly 300 in a direction from the rear bus bar frame 320 toward the front bus bar frame 310 or in a direction opposite thereto.

As described above, in the battery module according to an embodiment of the present disclosure, the combined body in which the bus bar frame assembly 300 and the cell stack 100 are combined may be easily inserted into the module frame 500 due to the guide structures protrusively formed at the bus bar frames 310, 320, and also the bus bar frames 310, 320 may be prevented from shaking inside the module frame 500 after the insertion.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery module, comprising:
a cell stack formed by stacking a plurality of battery cells;
a bus bar frame assembly having a front bus bar frame configured to cover one longitudinal side of the cell stack, a rear bus bar frame configured to cover another longitudinal side of the cell stack, and an upper cover configured to cover at least a portion of an upper surface of the cell stack; and
a module frame coupled to the bus bar frame assembly to accommodate the cell stack and the bus bar frame assembly, wherein the module frame includes an upper inner surface and an at least one side inner surface,
wherein the front bus bar frame includes at least one first upper guide, at least one first side guide, an upper terminal boundary, and a side terminal boundary, wherein the at least one first upper guide protrudes from the upper end terminal boundary toward the upper inner surface of the module frame, and the at least one first side guide protrudes from the side terminal boundary toward the at least one side inner surface of the module frame, and
wherein the rear bus bar frame includes at least one second upper guide, at least one second side guide, an upper terminal boundary, and a side terminal boundary, wherein the at least one second side guide protrudes from the upper terminal boundary toward the upper inner surface of the module frame, and the at least one second side guide protrudes from the side terminal boundary toward the at least one side inner surface of the module frame.

2. The battery module according to claim 1,
wherein the at least one first upper guide is interposed between the upper terminal boundary of the front bus bar frame and the upper inner surface of the module frame, and the at least one first side guide is interposed between the side terminal boundary of the front bus bar frame and the upper inner surface of the module frame, and the at least one second upper guide is interposed between the upper terminal boundary of the rear bus bar frame and the upper inner surface of the module frame, and the at least one second side guide is interposed between the side terminal boundary of the rear bus bar frame and the upper inner surface of the module frame.

3. The battery module according to claim 1,
wherein the front bus bar frame is hinged to one longitudinal end of the upper cover, and the rear bus bar frame is hinged to another longitudinal end of the upper cover.

4. The battery module according to claim 3,
wherein the upper cover has a plurality of guide accommodation grooves configured to accommodate the at least one first upper guide and the at least one second upper guide, respectively.

5. The battery module according to claim 4,
wherein each of the plurality of guide accommodation grooves has a notch form dented inward from either the one longitudinal end or the another longitudinal end of the upper cover.

6. The battery module according to claim 5,
wherein each of the plurality of guide accommodation grooves is formed to have a depth corresponding to a protruding height of the at least one first upper guide or the at least one second upper guide which the guide accommodation groove is configured to accommodate so that the at least one first upper guide and the at least one second upper guide do not interfere with the upper cover when the front bus bar frame and the rear bus bar frame are pivoted and unfolded to be parallel to the upper cover.

7. The battery module according to claim 1,
wherein the at least one first upper guide and the at least one second upper guide each have an inclined surface formed by chamfering a respective top edge thereof.

8. The battery module according to claim 7,
wherein the inclined surface formed at the at least one first upper guide and the inclined surface formed at the at least one second upper guide are oriented in the same direction.

9. The battery module according to claim 8,
wherein the inclined surface formed at the at least one first upper guide and the inclined surface formed at the at least one second upper guide are oriented toward one longitudinal side or another longitudinal side of the battery module.

10. A battery pack, comprising the battery module according to claim 1.

11. A vehicle, comprising the battery module according to claim 1.

* * * * *